3,335,117
VULCANIZING ACRYLATE RUBBER STOCK WITH 2-MERCAPTOIMIDAZOLINE
Morris B. Berenbaum, Levittown, and Gaylord A. Kanavel, Yardley, Pa., assignors to Thiokol Chemical Corporation, Bristol, Pa., a corporation of Delaware
No Drawing. Filed Oct. 1, 1962, Ser. No. 227,556
18 Claims. (Cl. 260—85.5)

This invention relates to novel acrylate rubber vulcanizates and more particularly pertains to cured compositions comprising acrylate interpolymers and to the method for preparing said compositions.

Acrylate rubber vulcanizates prepared in the past with conventional curing agents, such as triethylenetetramine, hexamethylenediamine carbamate and trimene base (a reaction product of ethyl chloride, formaldehyde, and ammonia) have often presented various problems to those in the art in the areas for instance of bin-stability, long cure-cycles and mold staining. Tetraethylenetetramine, for example, when compounded into rubber stocks shows a tendency to migrate to the surface and into the atmosphere during the storage of the stocks prior to the fabrication and vulcanization operations. The migration of a curing agent to the surface of a rubber stock and into the atmosphere is generally accompanied by an undesirable marked decrease in curing activity.

An object of this invention is the provision of novel acrylate rubber stocks which exhibit excellent nonstaining mold properties. Another object is the provision of acrylate rubber stocks which can be stored for prolonged periods of time prior to the curing operation without detrimental loss of curing activity. A further object is the provision of acrylate rubber stocks exhibiting constant physical properties during storage and which require shorter cure periods than the cure periods required where on of the conventionally known curing agents of the prior art is used.

It has been unexpectedly found, according to the present invention that 2-mercaptoimidazoline can be used as a curing agent to produce polyacrylate based rubber stocks having good bin-stability and which require relatively short cure cycles if the acrylate interpolymers to be cured therewith are formed from a major portion of one or more nonchlorine containing polymerizable monomeric acrylate materials such as methyl methacrylate, ethyl acrylate, butyl acrylate, methyl acrylate, acrylonitrile and ethyl hexylacrylate and a minor portion at least about 1 to 5 weight percent, of one or more chlorine containing, ethylenically unsaturated, polymerizable monomers such as 2-chloroethylvinyl ether and chloroethyl acrylate.

About 1 to 4 and preferable about 2 parts by weight of the 2-mercaptoimidazoline are used in curing every 100 parts by weight of the acrylate interpolymers.

The bin stability, cure cycle and mold staining properties of the stocks prepared with 2-mercaptoimidazoline may be further improved, according to the present invention, if there is used with this curing agent about 2 to 10 and preferable about 5 parts of one or more curing agent modifiers such as, dibasic lead phosphite and red lead. The use of red lead is preferred to help prevent pock marking of the rubbers during the relatively short cure cycles provided by the process of the present invention. The use of dibasic lead phosphite is preferred to help improve the compression set properties of the product.

The curing agent, 2-mercaptoimidazoline, is a powdery material which may be readily incorporated into the acrylate stocks in the milling operation. The curing agent and curing agent modifiers of the present invention may be used, moreover, in combination with the usual acrylate rubber stock adjuvants such as reinforcing agents, fillers, accelerators, plasticizers, antioxidants, age resistors, resins, dyes, pigments, fungicides, etc.

The rubber stocks prepared according to the present invention may be prepared on conventional milling equipment and cured according to conventional procedures using a cure temperature of about 275° F. to 450° F. for 4 to 30 minutes, the higher cure temperatures being used for the shorter cure periods.

In the polymerization of the acrylate interpolymers the monomers are charged into a vessel containing a suspending agent and water where the temperature of the vessel is regulated within the range of room temperature to 50° C. To this mixture is then added an initiator completely dissolved in a solvent and the reaction vessel is heated at a temperature within the range of 50° C. to 90° C. until the polymerization is complete.

It is advantageous for the solvent medium that is employed to boil at about the desired polymerization temperature. In this way, the utilization of the reflux techniques permits an easy means for the reaction mass to be agitated during the polymerization. The amount of initiator that is employed is generally from 0.05 to 1.0 percent by weight, based on the weight of the reacting monomers. Preferably, an amount of initiator of about 0.1 weight percent is utilized. The initiators employed are azobisisobutryonitrile, benzoyl peroxide. The amount of suspending agent that is employed is generally about 1.5 percent by weight, based on the weight of the reacting monomers. It is important that the suspending agent be completely dissolved in a solvent before being added to the monomer mixture. The solvent for the initiator may be benzene.

Several procedures may be used for the recovery and purification of the polymerized product from the reaction mass. For example, the reaction mass may be washed in a salt solution and then washed with water until the water coming off is clean.

The vulcanized acrylates prepared according to the present invention are useful as valve stem seals, rear main seals, lip seals, spring loaded oil seals, inner clutch piston seals, ball bearing shields, cements, specialty aircraft components, coated fabrics, and hoses and parts for heavy duty, off-road equipment.

The following examples are merely illustrative of the present invention and are not intended as a limitation upon the scope thereof.

*Example 1*

To a 500 gallon reactor equipped with an agitator rotating at a speed of 155 r.p.m. was added 195 gallons of water and the temperature was adjusted to 80–88° F. To the water was added 10 gallons of a 30% solution of a suspending agent Alcogum PA–15 (solution of sodium polyacrylate marketed by Alco Oil & Chemical Corp.). Then to the reactor was charged 73 gallons of ethyl acrylate, 4.6 gallons of vinyl-2-chloroethyl ether, and 413 ml. of a solution of 96.7 grams of azobisisobutyronitrile completely dissolved in 1386 ml. of benzene.

Steam was used to heat the batch to 150° F. over a 30 minute period and then to 165° to 184° F. over a 60 minute period. Then the batch was heated carefully until refluxing started at approximately 184 to 186° F. The jacket was drained and the temperature allowed to raise exothermically to between 194° to 198° F.

Then three equal portions of 200 ml. of benzene was added every 22 minutes for the first 66 minutes. The batch was heated to reflux temperature in 81 minutes and held at that temperature for 30 minutes. The unreacted ethyl acrylate was distilled off until the distillate only contained 5 cc. of ethyl acrylate/500 cc. of water. Then the ethyl acrylate was allowed to separate from the water and 10 grams of hydroquinone methyl ether per 100 parts of ethyl acrylate layer was added.

WASHING PROCEDURE

In a vat, a salt solution was made up consisting of 237 gallons of water and 165 lbs. of pure salt. The batch prepared above was dropped to the salt solution and agitated at full speed for 30 minutes. Then the vat was filled with water and the beads were allowed to settle for 90 minutes after which time the water was decanted off. The washings were repeated by filling the vat with 75/85° F. water, agitating 15 minutes, allowing the batch to settle for 60 minutes and then decanting off the water until the water was clean. The product, a 95/5 by weight ethylacrylate/vinyl-2-chloroethyl ether interpolymer, was light amber in color having a specific gravity at 25°-25° C. of 1.08 and a Mooney Plasticity (ML 1+3) at 212° F. of 50±5 and at 295° F. of 39.

*Example 2*

To a 500 gallon reactor equipped with an agitator rotating at 120 r.p.m. was added 177.6 gallons of water and the temperature was adjusted to 80–88° F. To the water was added 10 gallons of 4.5% solution of Alcogum PA-15. Then to the reactor there was charged 66.3 gallons of ethyl acrylate, 4.2 gallons of vinyl-2-chloroethyl ether, and 60% of a solution of 109 grams of benzoyl peroxide completely dissolved in 1000 cc. of benzene. Steam was used to heat the batch to 150° F. over a 30 minute period and to 165° to 180° F. over a 60 minute period. Then the batch was heated carefully until refluxing started between 165° to 180° F. The jacket was drained and the temperature allowed to raise exothermically to between 194° to 198° F.

Then two equal portions of 200 ml. of benzene was added every hour for two hours. The batch was heated to reflux temperature in 140 minutes and held at that temperature for 20 minutes. The unreacted ethyl acrylate was distilled off until the distillate only contained 5 cc. of ethylacrylate/500 cc. of water. Then the ethyl acrylate was allowed to separate from the water and dropped to a salt solution for washing. The washing procedure of Example 1 was followed. The product, a 95/5 by weight ethylacrylate/vinyl-2-chloroethyl ether interpolymer, was light amber in color having a specific gravity at 25/25° C. of 1.08 and a Mooney Viscosity at 212° F. (ML4) of 50±5.

*Example 3*

To a 500 gallon reactor equipped with an agitator rotating at a speed of 120 r.p.m. was added 1544 pounds of water and the temperature was adjusted to 113° to 122° F. To the water was added 29.8 pounds of 4.5% solution of Alcogum PA-15. Then to the reactor was charged 383.2 pounds of ethyl acrylate, 136.9 pounds of butyl acrylate, 27.4 pounds of vinyl-2-chloroethyl ether and 375 ml. of a solution of 130.8 grams of azobisisobutyronitrile completely dissolved in 1875 ml. of benzene.

Steam was used to heat the batch to 150° F. over a 30 minute period and from 150° F. to 165°–180° F. over a 60 minute period. Then the batch was heated carefully until refluxing started between 165° and 180° F. The jacket was drained and the temperature allowed to raise exothermically to between 194° to 198° F. Then five equal portions of 200 ml. of benzene was added every 22 minutes for 110 minutes. The batch was heated to reflux temperature in 125 minutes and held at that temperature for 30 minutes. The unreacted ethylacrylate was distilled off until the distillate only contained 5 cc. of ethylacrylate/500 cc. of water. Then the ethyl acrylate/butyl acrylate/2-chlorovinylethyl ether was allowed to separate from water and dropped to water vat for washing. The washing procedure of Example 1 was followed where water was used for the initial washing instead of a salt solution.

The product, 70/25/5 by weight ethyl acrylate/butyl acrylate/2-chlorovinylethylether interpolymer, was water white in color having a Mooney Plasticity (ML4) at 212° F. of 43 and at 295° F. of 37.

*Example 4*

To a liter resin pot equipped with an agitator rotating at 500 r.p.m. was added 613 ml. of distilled water and the temperature was adjusted to 80°–88° F. To the water was added 458 ml. of a solution of 4.5 grams/100 ml. aqueous solution of Alcogum PA-15. Then to the pot was charged 166.6 ml. of butyl acrylate, 25.5 ml. of acrylonitrile, 8.2 ml. of 2-chloroethylvinyl ether, and in six additions after refluxing has started, a total of 0.0634 grams of azobisisobutyronitrile completely dissolved in 10 ml. of benzene. The reactor was heated to 87.5° C. and then slowly heated until refluxing started at approximately 90.6° C. The six equal portions of catalyst were added every 22 minutes for the first 132 minutes after which time the reactor was allowed to cool. The resulting product, 90/7/3 by weight, butylacrylate/acrylonitrile/2-chloroethylvinyl ether interpolymer, was drained into 2 liters of crushed ice and washed with water according to the procedure in Example 1 instead of a salt solution.

*Example 5*

Polymers prepared as in Examples 3 and 4 were milled with various compounding ingredients and cured according to the process of the present invention. The cure formulations used and properties of the cured materials obtained therewith are shown below:

|  | 1 | 2 |
|---|---|---|
| Cure Formulations (parts by weight): |  |  |
| Polymer as prepared in Example 3 | 100 |  |
| Polymer as prepared in Example 4 |  | 100 |
| Stearic Acid | 1 | 1 |
| Philblack A | 40 | 40 |
| 2-mercaptoimidazoline | 2 | 2 |
| Cure Procedure: Mold Cure 30′/310° F., followed by tempering of 24 hours/300° F. in air—properties of cured materials: |  |  |
| Tensile, p.s.i. | 1,750 | 1,280 |
| Elongation, percent | 210 | 175 |
| Shore A Hardness | 55 | 64 |

*Example 6*

The following master batch was prepared in a laboratory Banbury:

Pt. by wt.
Polymer prepared as in Example 2 _____ 100
Stearic Acid _____ 1
Philblack A _____ 40

To the master batch, the various cure systems were added on a rubber mill. The following Tables 1 and 2 summarize the properties of the acrylate interpolymer based compositions treated with 2-mercaptoimidazoline and the curing agent modifiers. For surface condition comments, the following apply:

(1) PM—Poorly pock marked surface
(2) SPM—Slightly pock marked surface
(3) Good—Good smooth surface.

TABLE I

| Formula | 1 | 2 | 3 | 4 | 5 |
|---|---|---|---|---|---|
| Cure agents used (parts by weight): | | | | | |
| 2-mercaptoimidazoline | 2 | 2 | 2 | 3 | 4 |
| Dibasic lead phosphite | | 6 | 10 | 10 | 10 |
| Properties of cured materials. All data below based on tempered specimens. Mold cure, 30'310° F. Tempering, 24 hrs at 300° F. in air: | | | | | |
| Mooney Scorch at 250° F. (min. to 4 at 10 pt. rise) | 30+/30+ | 30+/30+ | 30/30+ | 22/27 | 30/30+ |
| Surface Condition (tempered sheet) | PM | Good | Good | Good | Good |
| Compression Set, percent (22 hrs. at 302° F) | 60 | 45 | 40 | 42 | 39 |
| Physicals: | | | | | |
| Tensile | 1,480 | 1,970 | 1,410 | 1,470 | 1,350 |
| 200% Modulus | | | | | |
| Elongation | 170 | 140 | 150 | 120 | 110 |
| Shore A | 70 | 71 | 77 | 78 | 80 |
| Volume Swell, percent (70 hrs. at 302° F.): | | | | | |
| ASTM Oil No. 3 | | | | | |
| ASTM No. 4 | | | | | |
| Distilled Water (24 hrs. at 208° F.) | +10 | | +9 / −3 | +16 / 0.0 | |
| G 10,000 °F | | | | | +3 |

TABLE II

| Formula | 1 | 2 | 3 | 4 | 5 | 6 | 7 |
|---|---|---|---|---|---|---|---|
| Curing agents used (parts by weight): | | | | | | | |
| 2-mercaptoimidazoline | 1 | 1 | 1 | 2 | 2 | 2 | 3 |
| Red Lead | 2 | 5 | 10 | 2 | 4 | 6 | 10 |
| Properties of cured materials. All data below based on tempered specimens. Mold cure, 30'/310° F. Tempering, 24 hrs. at 300° F.: | | | | | | | |
| Mooney Scorch at 250° F. (min. to 4 and 10 pt. rise) | 30+/30+ | 30+/30+ | 30+/30+ | 24/28 | | | 24/29 |
| Surface Condition (tempered sheet) | SPM | Good | Good | Good | Good | Good | Good |
| Compression Set, Percent (ASTM D395 Method B) (22 hrs. at 302° F.) | 46 | | | 35 | 54 | 56 | 35 |
| Original Physicals: | | | | | | | |
| Tensile | 2,010 | 1,950 | 1,940 | 1,980 | 2,090 | 2,130 | 1,950 |
| 200% Modulus | 1,070 | 1,070 | 1,340 | 1,910 | | 2,130 | 1,830 |
| Elongation | 360 | 440 | 360 | 210 | 190 | 200 | 230 |
| Shore A | 61 | 67 | 68 | 65 | 73 | 76 | 81 |
| Heat Aged (oven) Physicals (70 hrs. at 302° F.): | | | | | | | |
| Tensile | | 2,210 | 2,140 | | | | |
| 200% Modulus | | 1,790 | 2,140 | | | | |
| Elongation | | 280 | 200 | | | | |
| Shore A | | 70 | 73 | | | | |
| Volume Swells, Percent at (70 hr. at 302° F.): | | | | | | | |
| ASTM Oil No. 3 | +17 | +11 | +11 | | | | |
| ASTM Oil No. 4 | | +1.5 | +3 | | | | |
| Distilled Water (24 hrs. at 208° F.) | | | | +12 | | | |
| G 10,000° F | | | | | | | +8 |

Example 7

A master batch was prepared using the interpolymer prepared in Example 2 and press cured with the curing agent and modifiers of the present invention shown in the resulting formulation for 30 minutes at 310° F. followed by a 24 hour tempering at 302° F. in air.

Masterbatch:

| | |
|---|---|
| Polymer as prepared in Example 2 | 100 |
| Stearic acid | 1 |
| Philblack A | 40 |

| Formulation (parts by weight) | A | B |
|---|---|---|
| NA-22 | 3 | 4 |
| Red Lead | 10 | |
| Dyphos* | | 10 |
| Tensile, p.s.i | 2,150 | 1,350 |
| Elongation, percent | 90 | 110 |
| Hardness, Shore A | 91 | 80 |
| Compression Set, 22 hrs. at 302° F | 35 | 39 |

*Dibasic lead phosphite.

Example 8

A bin-stability study was made on an interpolymer as prepared in Example 1 and cured with 2-mercaptoimidazoline and red lead.

The formulation used as well as Mooney Scorch test and other physical properties of the resulting cured materials after various periods of storage are shown in the table below. The rubber stock was mold cured for 30 minutes at 300° F. and tempered for 24 hours in an air circulating oven at 300° F.

| | Original physicals after ageing 1 day at room temperature | Aged for 36 days at room temperature | Aged for 36 days at 120°F |
|---|---|---|---|
| Tensile, p.s.i | 2,250 | 1,830 | 2,000 |
| 100 Modulus, p.s.i | 1,210 | 810 | 820 |
| 200 Modulus, p.s.i | | | 2,050 |
| 300 Modulus, p.s.i | | | |
| Elongation, percent | 180 | 180 | 200 |
| Shore A, pts | 68 | 70 | 70 |

MOONEY SCORCH DATA AT 250° (F.)
[Minutes for 4 and 10 point rise]

Days aged at room temperature

| 12/17 | 13/17 | 13/17 | 14/18 | 12/15 | 12/16 | 12/16 | 12/16 | 10/14 | 10/15 | 10/12 | 10/11 | 11/15 | 11/15 |
|---|---|---|---|---|---|---|---|---|---|---|---|---|---|

Example 9

To a reactor equipped with an agitator rotating at a speed of 200 r.p.m. was added 1615.4 grams of water and the temperature was adjusted to 58° C. To the water was added 108.7 grams of a 30% solution of a suspending agent Alcogum PA-15. Then to the reactor was charged 560.2 grams of ethyl acrylate, 25.2 grams of 2-chloroethylacrylate, and 8 ml. of solution of 0.2137 grams of azobisisobutyronitrile completely dissolved in 40 ml. of benzene.

The reactor was heated carefully until reflux started at approximately 83.5° C.

Then five equal portions of 6.4 ml. of a solution of 0.2137 g. of azobisisobutyronitrile completely dissolved in 40 ml. of benzene was added every 22 minutes for the first 110 minutes. The batch was heated to reflux temperature and held at that temperature for 30 minutes. The unreacted ethyl acrylate was distilled off and the resulting polymer allowed to cool and dropped to water for washing. The product, an ethyl acrylate/chloroethyl acrylate interpolymer, was white in color having a chlorine content of 1.01%.

The polymer prepared above was milled with the following ingredients and cured according to the process of the present invention. The cure formulations used and properties of the cured materials obtained therewith are shown below.

| Cure Formulations (parts by weight) | 1 | 2 |
|---|---|---|
| Polymer as prepared above | 100 | 100 |
| Stearic Acid | 1 | 1 |
| Philblack A | 40 | 40 |
| 2-mercaptoimidazoline | 2 | 2 |
| Red Lead | | 5 |
| Cure Procedure: Mold Cure 30'/310° F., followed by tempering of 24 hours/300° F. in air—properties of cured materials: | | |
| Tensile, p.s.i. | 1,750 | 2,090 |
| Elongation, percent | 230 | 170 |
| Shore A Hardness | 68 | 79 |

We claim:

1. A vulcanizable acrylate interpolymer rubber stock comprising, in weight ratio, 100 parts by weight of, as the vulcanizable rubber, an acrylate interpolymer consisting of a major portion of at least one polymerizable, nonchlorine containing acrylate monomer and a minor portion of at least one polymerizable, ethylenically unsaturated chlorine containing monomer, and about 1 to 4 parts by weight of a curing agent for said interpolymer consisting essentially of 2-mercaptoimidazoline.

2. A rubber stock as in claim 1 in which said nonchlorine containing acrylate monomer is selected from the group consisting of ethyl acrylate, methylmethacrylate, butyl acrylate, methyl acrylate, acrylonitrile and ethyl hexylacrylate.

3. A rubber stock as in claim 1 in which at least one of said nonchlorine containing monomers is ethyl acrylate.

4. A rubber stock as in claim 1 in which at least one of said nonchlorine containing monomers is butyl acrylate.

5. A rubber stock as in claim 1 in which at least one of said nonchlorine containing monomers is acrylonitrile.

6. A rubber stock as in claim 1 in which said acrylate interpolymer contains about 1 to 5% by weight of said chlorine containing monomer.

7. A rubber stock as in claim 1 in which said chlorine containing monomer is 2-chloroethyl vinyl ether.

8. A rubber stock as in claim 1 in which said chlorine containing monomer is chloroethyl acrylate.

9. A rubber stock as in claim 1 further comprising with respect to said weight ratio about 2 to 10 parts by weight of a curing agent modifier.

10. A rubber stock as in claim 9 in which said curing agent modifier is red lead.

11. A rubber stock as in claim 9 in which said curing agent modifier is dibasic lead phosphite.

12. A process of vulcanizing acrylate based interpolymers containing a minor portion of chlorine containing monomeric moieties comprising curing said interpolymers in the presence of about 1 to 4 parts by weight, for every 100 parts by weight of said interpolymer being cured, of a curing agent consisting essentially of 2-mercaptoimidazoline.

13. A process as in claim 12 in which the curing is conducted at 275° to 450° F.

14. A process as in claim 12 in which said curing agent comprises 2-mercaptoimidazoline in combination with 2 to 10 parts by weight, for every 100 parts by weight of said interpolymer being cured, of at least one curing agent modifier.

15. A process as in claim 14 in which at least one of said curing agent modifiers is red lead.

16. A process as in claim 14 in which at least one of said curing agent modifiers is dibasic lead phosphite.

17. A process as in claim 12 in which the chlorine containing monomer is 2-chloroethylvinyl ether.

18. A process as in claim 12 in which the chlorine containing monomer is chloroethyl acrylate.

References Cited

UNITED STATES PATENTS

| | | | |
|---|---|---|---|
| 2,492,170 | 12/1949 | Mast et al. | 260—86.3 |
| 2,926,718 | 3/1960 | Baldwin et al. | 260—41.5 |
| 2,944,578 | 7/1960 | Baldwin et al. | 260—41.5 |
| 3,055,857 | 9/1962 | Hawley et al. | 260—41.5 |

OTHER REFERENCES

Zimmerman et al., Handbook of Material Trade Names, supplement II, 1957, page 78.

Rubber World: Materials and Compounding Ingredients for Rubber and Plastics, page 198.

MORRIS LIEBMAN, *Primary Examiner.*

L. T. JACOBS, *Assistant Examiner.*